United States Patent
Saori

(10) Patent No.: US 7,417,800 B2
(45) Date of Patent: Aug. 26, 2008

(54) ZOOM LENS SYSTEM
(75) Inventor: Masakazu Saori, Saitama (JP)
(73) Assignee: Hoya Corporation, Tokyo (JP)
( * ) Notice: Subject to any disclaimer, the term of this patent is extended or adjusted under 35 U.S.C. 154(b) by 0 days.
(21) Appl. No.: 11/565,735
(22) Filed: Dec. 1, 2006
(65) Prior Publication Data
US 2007/0127136 A1 Jun. 7, 2007
(30) Foreign Application Priority Data
Dec. 5, 2005 (JP) ............................ P2005-350629
(51) Int. Cl.
G02B 15/14 (2006.01)
(52) U.S. Cl. .................. 359/682; 359/686; 359/715; 359/740; 359/783; 359/726; 359/557
(58) Field of Classification Search ......... 359/680–682, 359/686, 715, 740, 783, 557, 726
See application file for complete search history.

(56) References Cited

U.S. PATENT DOCUMENTS

| 5,847,875 | A | * | 12/1998 | Kodama et al. ............. 359/682 |
| 7,016,119 | B2 | | 3/2006 | Saori |
| 7,019,912 | B2 | | 3/2006 | Saori |
| 7,177,094 | B2 | | 2/2007 | Mihara et al. |
| 2004/0021783 | A1 | | 2/2004 | Mihara |
| 2006/0056050 | A1 | * | 3/2006 | Caldwell et al. ............. 359/686 |
| 2006/0061873 | A1 | | 3/2006 | Saori |
| 2006/0139768 | A1 | | 6/2006 | Saori |
| 2006/0221463 | A1 | | 10/2006 | Enomoto |
| 2007/0047097 | A1 | | 3/2007 | Nakamura et al. |

FOREIGN PATENT DOCUMENTS

| EP | 1630584 | 3/2006 |
| JP | 2003-307677 | 10/2003 |
| JP | 2004-004533 | 1/2004 |
| JP | 2004-056362 | 2/2004 |
| JP | 2004-354869 | 12/2004 |

OTHER PUBLICATIONS

English language Abstract of JP 2003-307677.
English language Abstract of JP 2004-004533.
English language Abstract of JP 2004-056362.
English language Abstract of JP 2004-354869.

* cited by examiner

Primary Examiner—Evelyn A. Lester
(74) Attorney, Agent, or Firm—Greenblum & Bernstein, P.L.C.

(57) ABSTRACT

A zoom lens system includes a negative first lens group, a positive second lens group, a positive third lens group and positive fourth lens group, in this order from the object.

The negative first lens group includes a reflection member, and the first lens group remains stationary when zooming is being performed from the short focal length extremity to the long focal length extremity.

The zoom lens system satisfies the following conditions:

$$1.0 < f2/(fw \times ft)^{1/2} < 1.5 \quad (1)$$

$$1.2 < |f1a|/fw < 1.8 \ (f1a < 0) \quad (2)$$

$$2.0 < f1b/ft < 4.0 \quad (3)$$

wherein
f2: the focal length of the positive second lens group;
fw: the focal length of the entire zoom lens system at the short focal length extremity;
ft: the focal length of the entire zoom lens system at the long focal length extremity;
f1a: the combined focal length of an object-side lens element with respect to the reflection member; and
f1b: the combined focal length of image-side lens elements with respect to the reflection member.

18 Claims, 9 Drawing Sheets

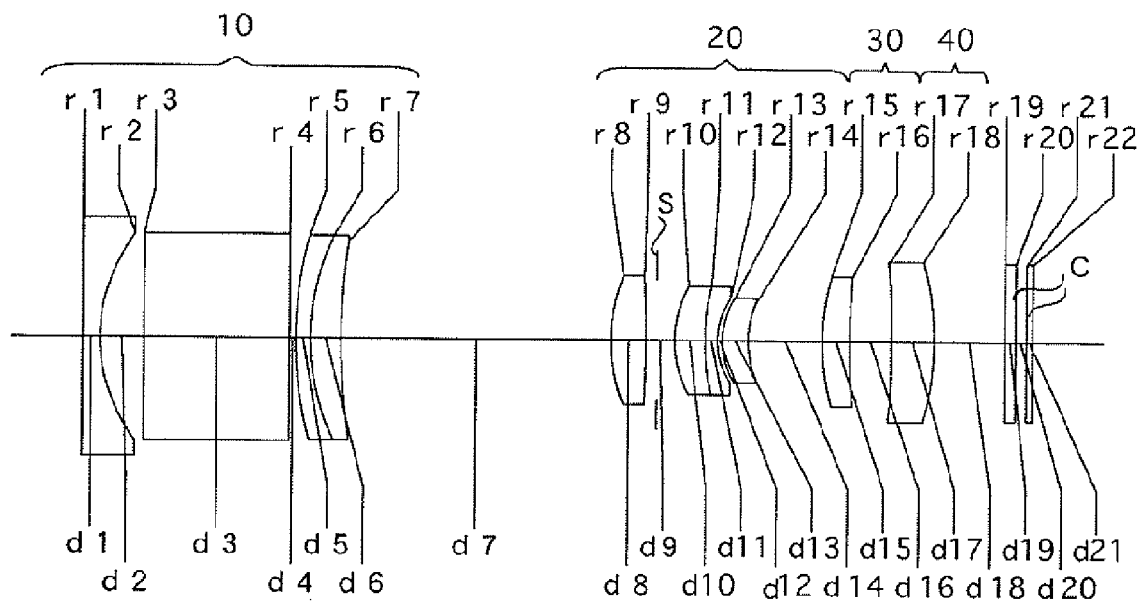

Fig.3
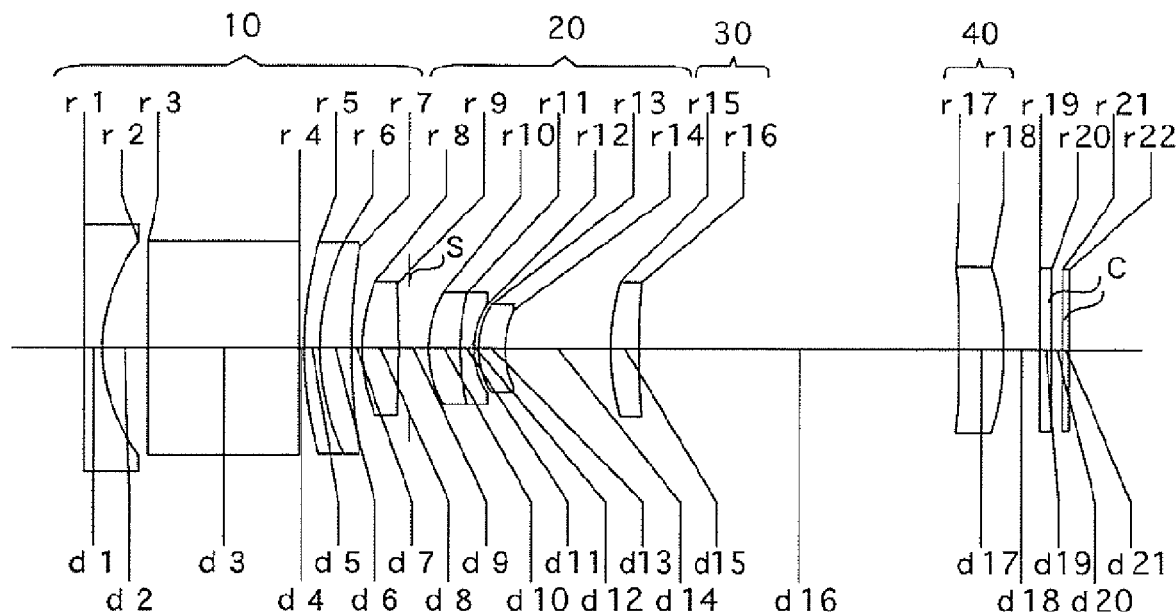
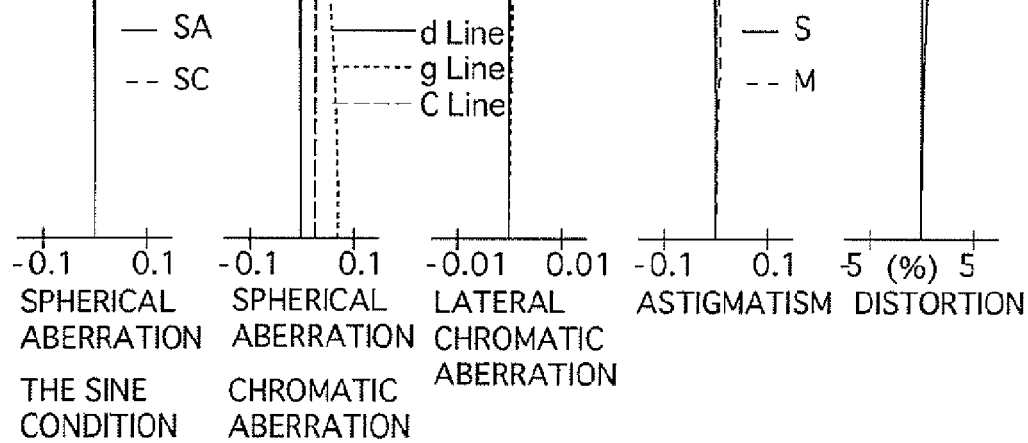
Fig.4A   Fig.4B   Fig.4C   Fig.4D   Fig.4E

Fig.5
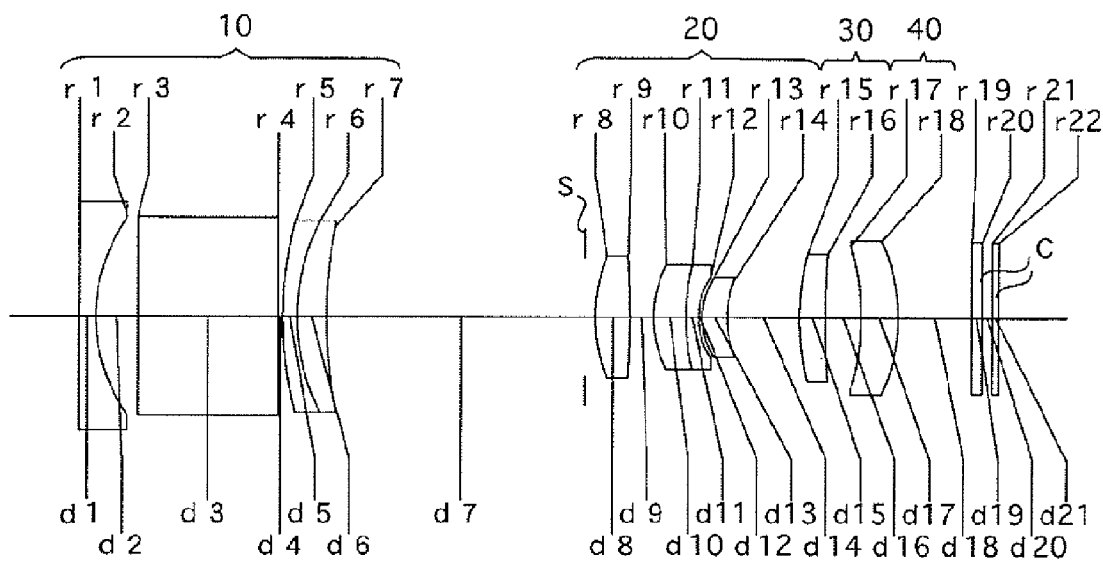
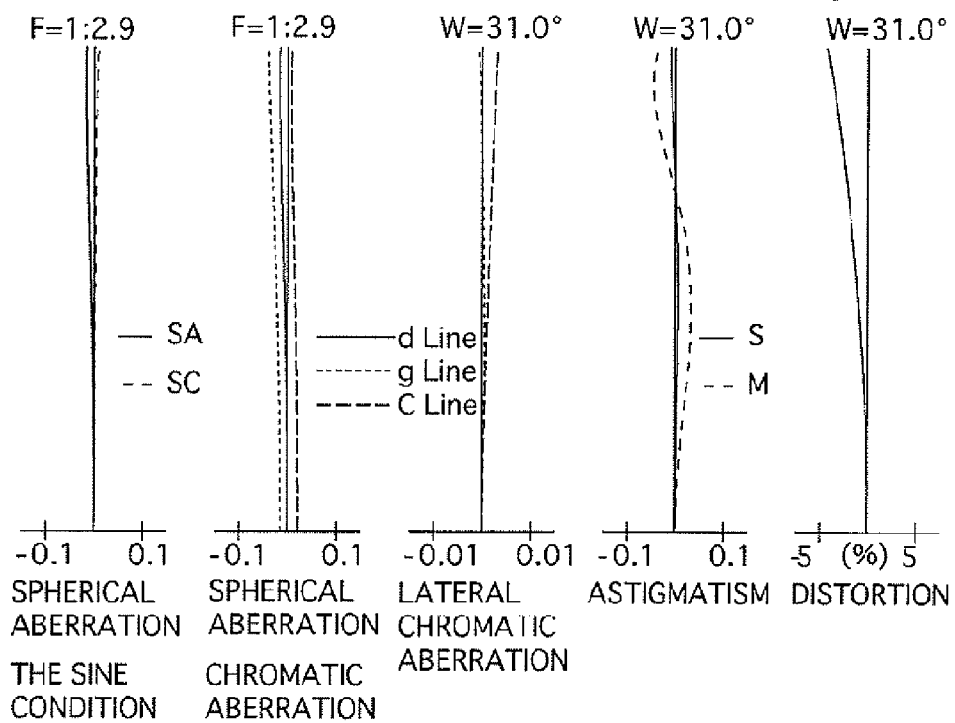

Fig. 13
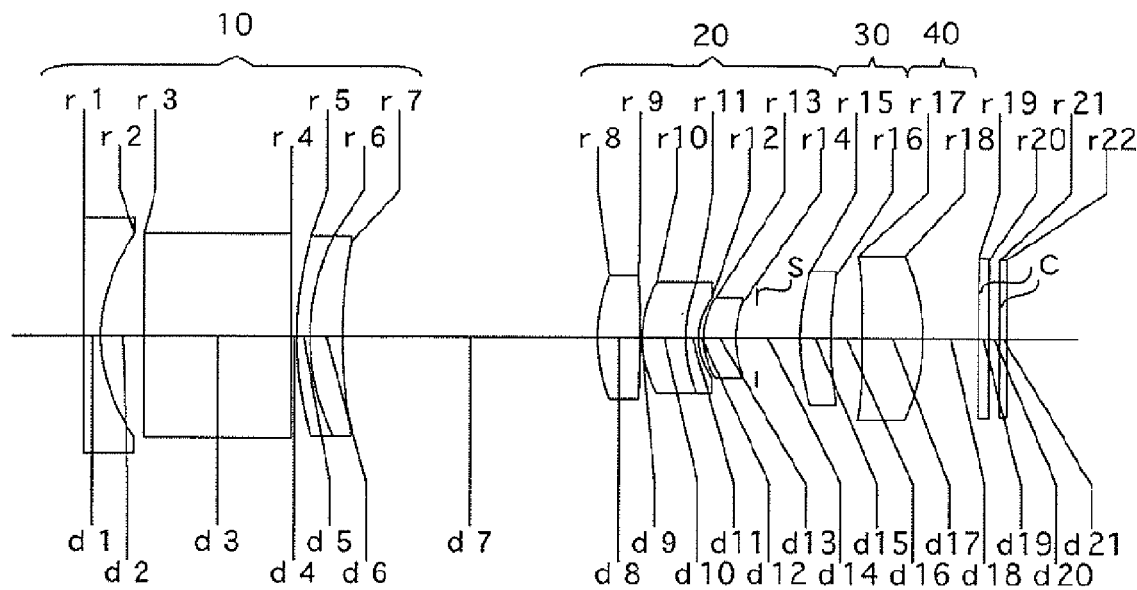
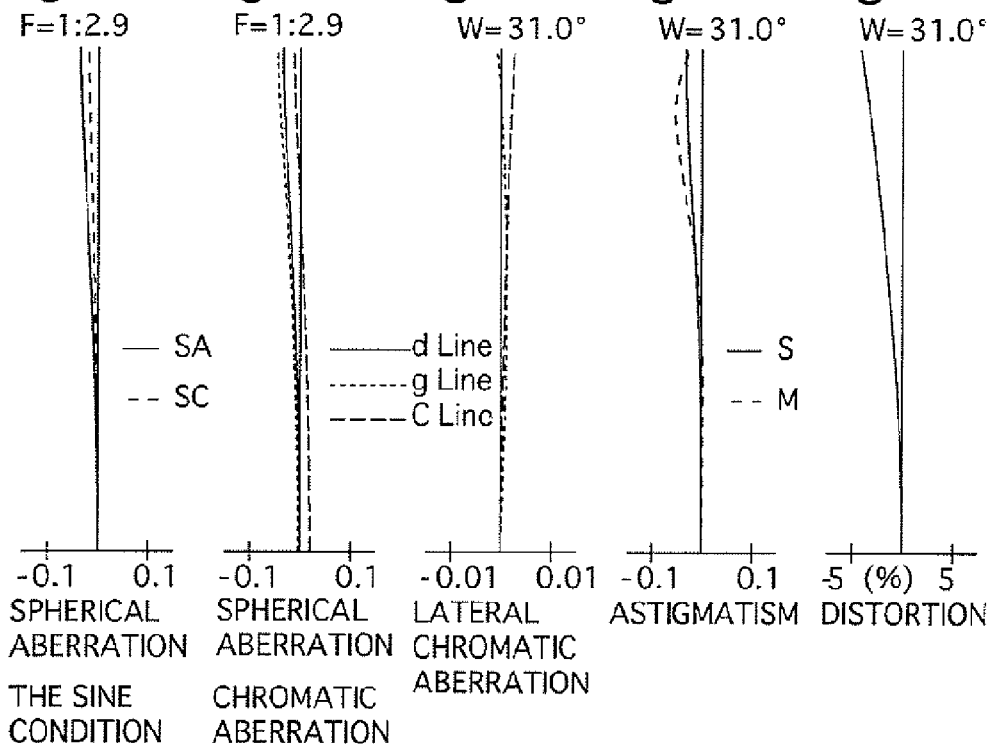
Fig.14A  Fig.14B  Fig.14C  Fig.14D  Fig.14E

ZOOM LENS SYSTEM

BACKGROUND OF THE INVENTION

1. Field of the Invention

The present invention relates to a zoom lens system, and in particular relates to a zoom lens system suitable for a lens system having a refractive optical system (reflection member) and/or an image-stabilizing lens system.

2. Description of the Prior Art

In a zoom lens system for a compact digital camera, a positive-lead type zoom lens system and a negative-lead type zoom lens systems have been known in the art.

A positive-lead type zoom lens system can secure a larger zoom ratio without difficulty; and since the most object-side lens group thereof having a positive refractive power converges the light bundle, the diameter of subsequently lens groups can be made smaller, i.e., miniaturization of the subsequent lens groups in the radial direction is attained. However, a positive-lead type zoom lens system requires a larger number of lens elements.

On the other hand, a negative-lead type zoom lens system can reduce the number of lens elements. However, since the most object-side lens group having a negative refractive power diverges the light bundle, a negative-lead type zoom lens system is disadvantageous for miniaturization of the subsequent lens groups in the radial direction.

Furthermore, a zoom lens system can be categorized into two types: a retractable type and a fixed-length type.

In a retractable type zoom lens system, lens groups for zooming including the first (most object-side) lens group are arranged to move in the optical-axis direction with respect to the image plane when zooming is being performed; and the lens groups for zooming are also generally arranged to move in the optical-axis direction toward the image plane for the purpose of miniaturization of the camera in the camera-thickness direction when the camera is being carried (i.e., in a non-photographic state). On the other hand, a retractable type zoom lens system have the following drawbacks: (i) a longer start-up time, and (ii) slight vulnerability against waterproofing, dust proofing and shock resistance. In regard to (i), a longer start-up time is necessary, since the lens groups are moved from the retracted (non-photographic state) state to a ready-to-photograph state. In regard to (ii), due to an arrangement in which the first (most object-side) lens group is movable, the functions of waterproofing, dust proofing and shock resistance are sacrificed to some extent.

A fixed-length type zoom lens system can advantageously exhibit the functions of waterproofing, dust proofing and shock resistance, since movable lens groups for zooming are not exposed. On the other hand, the optical path length of a fixed-length type zoom lens system inevitably becomes longer. Therefore in order to attain miniaturization of a fixed-length type zoom lens system (i.e., reduce the thickness of the camera), it is known in the art to provide a reflection member (optical path bending member) such as a prism or mirror which bends the optical path within the lens system. Furthermore, such a compact (slim-bodied) camera is more difficult to hold securely, so that camera shake (image blur) easily occurs.

As explained, there are advantages and disadvantages in each of a negative-lead type zoom lens system, a positive-lead type zoom lens system, a retractable zoom lens system and a fixed-length zoom lens system. Respective type(s) is employed in accordance with requirements of size, zoom ratio, and optical performance, etc.

Moreover, it should be known that various proposals have been countlessly made nowadays in order to attain both miniaturization (e.g., a slimmer camera body) and a higher optical performance in a well balanced manner.

SUMMARY OF THE INVENTION

The present invention is to provide a negative-lead type zoom lens system with a zoom ratio of approximately 3, which is suitable for a fixed-length zoom lens system having a refractive optical system (reflection member), and/or having an image-stabilizing system with an image-stabilizing lens group.

According to a first aspect of the present invention, there is provided a zoom lens system including a first lens group having a negative refractive power (hereinafter, a negative first lens group), a second lens group having a positive refractive power (hereinafter, a positive second lens group), a third lens group having a positive refractive power (hereinafter a positive third lens group) and a fourth lens group having a positive refractive power (hereinafter, a positive fourth lens group), in this order from the object.

The negative first lens group further includes a reflection member, and remains stationary when zooming is performed from the short focal length extremity to the long focal length extremity.

The zoom lens system satisfies the following conditions:

$$1.0 < f2/(fw \times ft)^{1/2} < 1.5 \quad (1)$$

$$1.2 < |f1a|/fw < 1.8 \ (f1a<0) \quad (2)$$

$$2.0 < f1b/ft < 4.0 \quad (3)$$

wherein $f2$ designates the focal length of the positive second lens group;

$fw$ designates the focal length of the entire zoom lens system at the short focal length extremity;

$ft$ designates the focal length of the entire zoom lens system at the long focal length extremity;

$f1a$ designates the combined focal length of an object-side lens element with respect to the reflection member in the negative first lens group; and $f1b$ designates the combined focal length of image-side lens elements with respect to the reflection member in the negative first lens group.

It is preferable that the positive fourth lens group be arranged to move along the optical axis upon zooming from the short focal length extremity to the long focal length extremity.

The positive second lens group can be constituted by a positive lens element, a positive lens element, a negative lens element and a positive lens element, in this order from the object.

The positive fourth lens group is constituted by a positive single lens element having a convex surface facing toward the image. Further, the positive single lens element is preferably provided with an aspherical surface.

In the case where the positive second lens group includes a positive lens element, a positive lens element, a negative lens element and a positive lens element, in this order from the object, the negative lens element is preferably constituted by a meniscus lens element having the convex surface facing the object, and the image-side surface of the most image-side positive lens element of the positive second lens group is preferably formed as a concave surface.

It is preferable that the negative first lens group be constituted by a negative lens element, the reflection member, and cemented lens elements having a negative lens element and a positive lens element, in this order from the object.

In the case where the zoom lens system is formed as an image-stabilizing zoom lens system, the positive second lens group can be formed as an image-stabilizing lens group which is arranged to move in a direction orthogonal to the optical axis.

According to a second aspect of the present invention, there is provided a zoom lens system including a negative first lens group, a positive second lens group, a positive third lens group and a positive fourth lens group, in this order from the object.

The negative first lens group further includes a reflection member; and the first lens group remains stationary, and the positive fourth lens group is moved, when zooming is performed from the short focal length extremity to the long focal length extremity.

The positive fourth lens group is constituted by a positive single lens element having a convex surface facing toward the image. Further, the positive single lens element is preferably provided with at least one aspherical surface.

The positive second lens group is preferably constituted by a positive lens element, a positive lens element, a negative lens element and a positive lens element, in this order from the object.

According to a third aspect of the present invention, there is provided a zoom lens system including a negative first lens group, a positive second lens group, a positive third lens group and a positive fourth lens group, in this order from the object.

The negative first lens group further includes a reflection member, and remains stationary when zooming is performed from the short focal length extremity to the long focal length extremity.

The positive second lens group is constituted by a positive lens element, a positive lens element, a negative lens element and a positive lens element, in this order from the object.

The negative lens element of the positive second lens group can be constituted by a meniscus lens element having the convex surface facing the object, and the image-side surface of the most image-side positive lens element of the positive second lens group is preferably formed as a concave surface.

It is preferable that the negative first lens group be constituted by a negative lens element, the reflection member, and cemented lens elements having a negative lens element and a positive lens element, in this order from the object.

In the case where the zoom lens system is formed as an image-stabilizing zoom lens system, it is preferable that the positive second lens group be formed as an image-stabilizing lens group which is arranged to move in a direction orthogonal to the optical axis.

According to a fourth aspect of the present invention, there is provided an image-stabilizing zoom lens system in which the positive second lens group is formed as an image-stabilizing lens group which is arranged to move in a direction orthogonal to the optical axis.

In the fourth aspect of the present invention, the negative first lens group can further include a reflection member, and the image-stabilizing zoom lens system preferably satisfies the following conditions:

$$1.0 < f2/(fw \times ft)^{1/2} < 1.5 \quad (1)$$

$$1.2 < |f1a|/fw < 1.8 \ (f1a<0) \quad (2)$$

$$2.0 < f1b/ft < 4.0 \quad (3)$$

wherein f2 designates the focal length of the positive second lens group;

fw designates the focal length of the entire zoom lens system at the short focal length extremity;

ft designates the focal length of the entire zoom lens system at the long focal length extremity;

f1a designates the combined focal length of an object-side lens element with respect to the reflection member in the negative first lens group; and f1b designates the combined focal length of image-side lens elements with respect to the reflection member in the negative first Lens group.

The positive second lens group is preferably constituted by a positive lens element, a positive lens element, a negative lens element and a positive lens element, in this order from the object.

The present disclosure relates to subject matter contained in Japanese Patent Application No. 2005-350629 (filed on Dec. 5, 2005) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, at the short focal length extremity, according to a first embodiment of the present invention;

FIGS. 2A, 2B, 2C, 2D and 2E show aberrations occurred in the lens arrangement shown in FIG. 1;

FIG. 3 is a lens arrangement of the zoom lens system, at the long focal length extremity, according to the first embodiment of the present invention;

FIGS. 4A, 4B, 4C, 4D and 4E show aberrations occurred in the lens arrangement shown in FIG. 3;

FIG. 5 is a lens arrangement of the zoom lens system, at the short focal length extremity, according to a second embodiment of the present invention;

FIGS. 6A, 6B, 6C, 6D and GE show aberrations occurred in the lens arrangement shown in FIG. 5;

FIG. 13 is a lens arrangement of the zoom lens system, at the short focal length extremity, according to a fourth embodiment of the present invention;

FIGS. 14A, 14B, 14C, 14D and 14E show aberrations occurred in the lens arrangement shown in FIG. 13;

DESCRIPTION OF THE PREFERRED EMBODIMENTS

Figure 17:
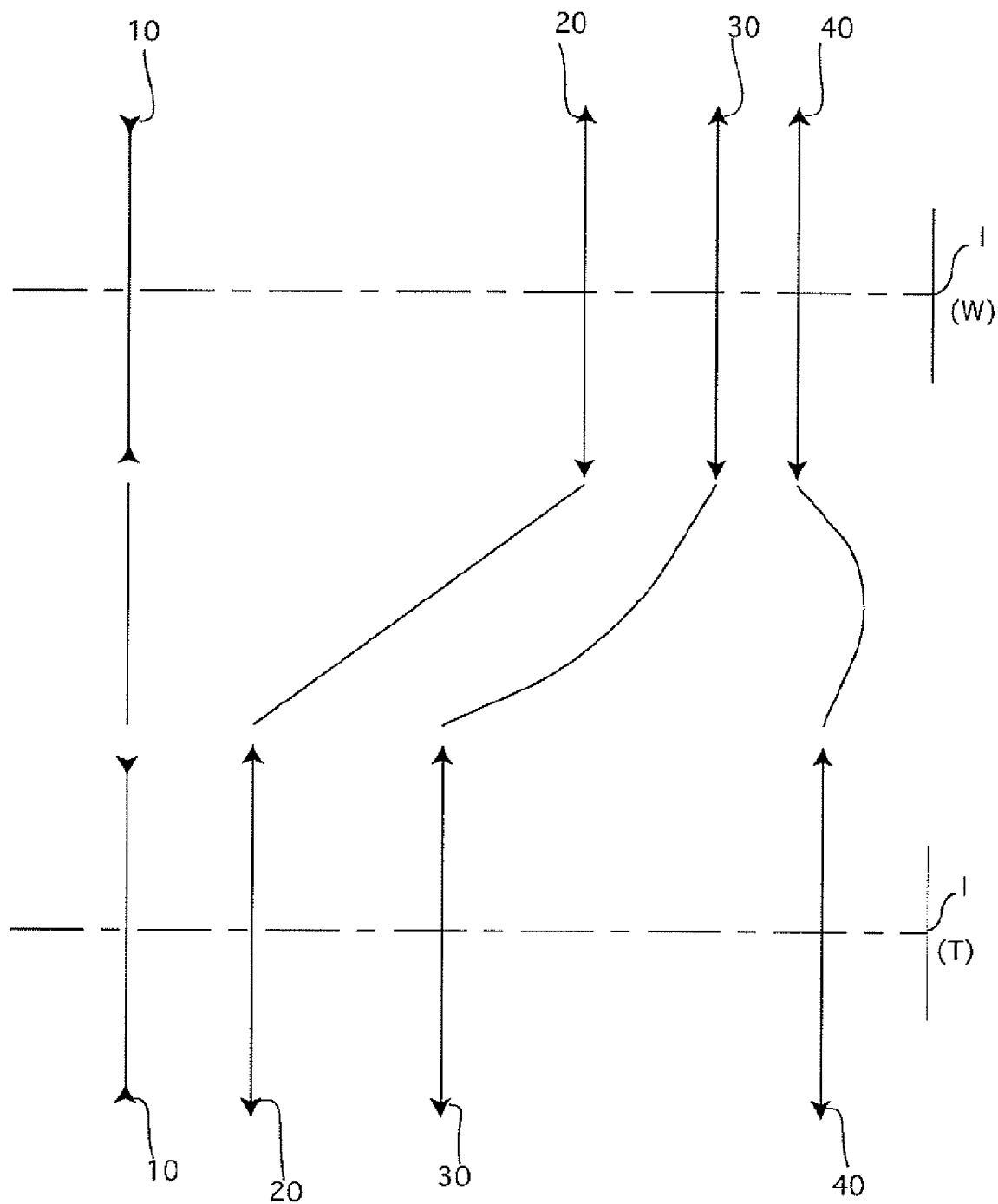
FIG. 17 is the schematic view of the lens-group moving paths for the zoom lens system according to the present invention.

The zoom lens system of the present invention, as shown in FIG. 17, includes a negative first lens group 10, a positive second lens group 20, a positive third lens group 30, and a positive fourth lens group 40, in this order from the object. A diaphragm S (not shown in FIG. 17) is provided in the vicinity of the positive second lens group 20 (either in front, in or behind) and integrally moves with the positive second lens group 20.

Upon zooming from the short focal length extremity (W) to the long focal length extremity (T), the negative first lens group 10 remains stationary; the positive second lens group 20 and the positive third lens group 30 constantly move toward the object all the way along, and the positive fourth lens group 40 first moves toward the image and thereafter and moves toward the object.

While the zooming is being performed, the distance between the negative first lens group 10 and the positive second lens group 20 constantly decreases all the way along; the distance between the positive negative second lens group 20 and the positive third lens group 30 becomes maximum at a middle area between the short focal length extremity and the long focal length extremity, and decreases toward the long focal length extremity, and the distance between the positive third lens group 30 and the positive fourth lens group 40 constantly increases all the way along.

Focusing is carried out by the positive third lens group 30 or the positive fourth lens group 40.

In such a negative-lead type zoom tens system, in the case where a zoom ratio is set to approximately 3, this zoom lens system can be constituted by a smaller number of lens elements.

Furthermore, since the negative first lens group 10 remains stationary, it is preferable to provide an optical-path bending element (reflection member) such as a prism or a mirror in the negative first lens group 10 in order to miniaturize the zoom lens system (a slimmer camera body). Providing a reflection member in the negative first lens group 10 is most effective for achieving a slimmer camera body.

In an arrangement where a reflection member is provided in the negative first lens group 10, it is preferable to constitute the negative first lens group 10 by a negative lens element, a reflection member, and cemented lens elements having negative lens element and a positive lens element, in this order from the object.

If such a reflection member were provided at the most object-side of the negative first lens group 10, the zoom lens system would become larger at the short focal length extremity by the amount of the angle-of-view thereat.

Moreover, if a plurality of lens elements were provided on the object side of the reflection member, the thickness of the negative first lens group 10 in the optical axis direction (depth) would increase.

Accordingly, it is desirable to provide a single negative lens element at the most object-side of the negative first lens group 10, and to reduce the incident angle of the light rays incident on the reflection member provided on the image side of the single negative lens element.

Furthermore, the negative first lens group 10 is preferably arranged to have a sufficient negative refractive power.

If the most object-side negative lens element is arranged to generate most of the negative refractive power, aberrations occurred in the most object-side negative lens element are magnified by the reflection member.

Therefore it is desirable to provide another (image-side) negative lens element on the image-side of the reflection member so that the negative refractive power is distributed over both the most object-side negative lens element and the image-side negative lens element. Still further, the negative first lens group 10 can include at least one positive lens element for the purpose of correcting aberrations occurred therein. Then, it is preferable to bond the image-side negative lens element and the positive lens element to form cemented lens elements, in this order from the object. By positioning the cemented lens elements on the image side of the reflection member, aberration of higher order can be prevented.

The positive second lens group 20 is a lens group for zooming, and preferably includes a positive lens element, a positive lens element, a negative lens element and a positive lens element, in this order from the object.

Furthermore, the most object-side positive lens element is preferably provided with an aspherical surface. Due to this aspherical surface of the most object-side positive lens element, the correcting of aberrations can suitably be made, even when the positive second lens group 20 is provided with a strong refractive power in order to make the traveling distance of the positive second lens group 20 shorter. Consequently, miniaturization of the zoom lens system is attained, and at the same time, the correcting of aberrations is adequately carried out.

The only negative lens element of the positive second lens group 20 is preferably formed as a negative meniscus lens element having the convex surface facing toward the object. If this meniscus lens element were formed to have the concave surface facing toward the object (i.e., the convex surface facing toward the image), spherical aberration is undesirably overcorrected.

The most image-side positive lens element of the positive second lens group 20 is preferably arranged to have a concave surface facing toward the image. If the most image-side positive lens element were to arranged to have a convex surface facing toward the image, spherical aberration and coma would largely occur.

In a zoom lens system of the four-lens-group arrangement, as described above, i.e., the negative lens group, the positive lens group, the positive lens group and the positive lens group in this order from the object, the positive second lens group is a lens group for zooming which substantially perform an image-forming function, relatively has a stronger refractive power, and can adequately correct aberrations occurred in the positive second lens group 20.

Accordingly, if an attempt is made to constitute the zoom lens system of the present invention as an image-stabilizing lens system in which the positive second lens group 20, as an image-stabilizing lens group, is arranged to move in a direction orthogonal to the optical axis, deterioration of aberrations due to such movement can be minimized and the amount of the movement for image stabilization is made smaller. Due to this arrangement, the mechanical structure of the positive second lens group 20 can be simplified.

Further, in the zoom lens system of the above four-lens-group arrangement, the negative first lens group 10 is a diverging lens group, the positive second lens group 20 is a lens group for zooming, the positive third lens group 30 and the positive fourth lens group 40 are lens groups for the correcting of the image plane (i.e., compensator lens groups).

The positive third lens group 30 and the positive fourth lens group 40 for the correcting of the image plane have a relatively stronger refractive power for the purpose of achieving miniaturization of the zoom lens system; and the positive second lens group 20 also has a stronger refractive power. Consequently, field curvature and astigmatism tend to occur upon zooming. In order to prevent these field curvature and astigmatism, the positive third lens group 30 and the positive fourth lens group 40 are required to vary the position of a light-progressing path of an off-axis (peripheral) light ray at each focal length point.

However, in the above-discussed zoom lens system of the four-lens-group arrangement, the positive fourth lens group conventionally remains stationary when zooming is performed. Therefore the position of a light-progressing path of an off-axis (peripheral) light ray in the positive fourth lens group 40 do not largely vary at each focal length position. Consequently, it is difficult to correct field curvature and astigmatism.

Unlike the conventional positive fourth lens group, the positive fourth lens group 40 of the present invention is arranged to move upon zooming, so that the correcting of field curvature and astigmatism, i.e., the correcting of the image plane, can be made sufficiently.

The positive fourth lens group 40 which is arranged to be movable upon zooming includes a single positive lens element having a convex surface facing toward toe image, and is preferably provided with at least one aspherical surface.

By constituting the positive fourth lens group 40 by a single lens element, telecentricity can be maintained at the periphery of the image plane, and the correcting of distortion can be suitably performed. Still further, field curvature and astigmatism caused by zooming can also be suitably corrected.

Condition (1) specifies the ratio of the focal length of the positive second lens group 20 to the geometric mean value of the focal length of the entire zoom lens system at the short and long focal length extremities. By satisfying condition (1), miniaturization of the zoom lens system and the correcting of aberrations can be attained at the same time.

If $f2/(fw \times ft)^{1/2}$ exceeds the upper limit of condition (1), the refractive power for zooming becomes weaker, so that a sufficient zoom ratio cannot be secured. Here, if an attempt is made to secure a sufficient zoom ratio, the traveling distance of each lens group has to be made longer. Consequently, miniaturization of the zoom lens system becomes difficult. Moreover, in the case where the positive second lens group 20 is arranged to perform an image-stabilizing operation, the effect of image-stabilization cannot be sufficiently obtained.

If $f2/(fw \times ft)^{1/2}$ exceeds the lower limit of condition (1), the correcting of aberrations becomes difficult. Further, fluctuation of aberrations becomes larger when the image-stabilizing operation is performed, so that suitable optical performance cannot be attained through the image-stabilizing operation.

Condition (2) specifies the ratio of the absolute value of the combined focal length of an object-side lens element (the negative lens element) with respect to the reflection member in the negative first lens group 10 to the focal length of the entire zoom lens system at the short focal length extremity. By satisfying condition (2), miniaturization of the zoom lens system and the correcting of aberrations can be attained at the same time.

If $|f1a|/fw$ exceeds the upper limit of condition (2), the refractive power of the negative lens element becomes weaker. Consequently, peripheral illumination cannot sufficiently be collected at the short focal length extremity, in particular.

If $|f1a|/fw$ exceeds the lower limit of condition (2), the refractive power of the negative lens element becomes stronger. Consequently, aberrations occurred in the negative lens element largely diverge when light rays progress in the reflection member, Therefore the correcting of aberrations occurred in the subsequent lens groups cannot suitably be performed.

Condition (3) specifies the ratio of the combined focal length of image-side lens elements (the cemented lens elements having the negative lens element and the positive lens element) with respect to the reflection member in the negative first lens group 10 to the focal length of the entire zoom lens system at the long focal length extremity.

If $f1b/ft$ exceeds the upper limit of condition (3), the refractive power of the cemented lens elements becomes weaker, so that aberrations occurred in the cemented lens elements cannot suitably be corrected in the negative first lens group 10. Consequently, fluctuation of aberrations upon zooming becomes larger.

If $f1b/ft$ exceeds the lower limit of condition (3), the refractive power of the cemented lens elements becomes stronger, so that it becomes difficult to correct spherical aberration and coma.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and ν designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the zoom lens system, at the short focal length extremity, according to the first embodiment of the present invention. FIGS. 2A through 2E show aberrations occurred in the lens arrangement shown in FIG. 1.

FIG. 3 is the lens arrangement of the zoom lens system, at the long focal length extremity, according to the first embodiment of the present invention. FIGS. 4A through 4E show aberrations occurred in the lens arrangement shown in FIG. 3.

Table 1 shows the numerical values of the first embodiment.

The zoom lens system of the present invention includes a negative first lens group 10, a positive second lens group 20, a positive third lens group 30, and a positive fourth lens group 40, in this order from the object. A diaphragm S is provided in the positive second lens group 20.

The first lens group 10 includes a planoconcave lens element having a flat surface facing toward the object, a prism, and cemented lens elements having a negative meniscus lens element having the convex surface facing toward the object and a positive meniscus lens element having the convex surface facing toward the object, in this order from the object.

The positive second lens group 20 includes a biconvex positive lens element, cemented lens elements having a positive meniscus lens element having the convex surface facing toward the object and a negative meniscus lens element having the convex surface facing toward the object, and a positive meniscus lens element having the convex surface facing toward the object, in this order from the object.

The positive third lens group 30 includes a positive meniscus single lens element having the convex surface facing toward the object.

The positive fourth lens group 40 includes a positive meniscus single lens element having the convex surface facing toward the image.

A cover glass C is provided on the image-side of the positive fourth lens group 40 (in front of the image pickup device).

The diaphragm S is provided 0.50 behind surface No. 9 (i.e., the image-side surface of the biconvex lens element of the positive second lens group 20).

TABLE 1

F = 1:2.9-4.1-5.5
f = 6.28-10.20-16.60
W = 31.0-19.6-12.1
fB = 0.59-0.59-0.59

| Surf. No. | r | d | Nd | ν |
|---|---|---|---|---|
| 1 | ∞ | 0.80 | 1.80610 | 40.9 |
| 2* | 7.332 | 2.05 | — | — |
| 3 | ∞ | 6.80 | 1.84666 | 23.8 |
| 4 | ∞ | 0.27 | — | — |
| 5 | 18.001 | 0.70 | 1.77187 | 49.7 |
| 6 | 11.055 | 1.43 | 1.84666 | 23.8 |
| 7 | 28.619 | 12.60-6.92-0.50 | — | — |
| 8* | 8.253 | 1.62 | 1.58636 | 60.9 |
| 9* | −45.392 | 1.35 | — | — |
| 10 | 5.185 | 1.41 | 1.48749 | 70.2 |
| 11 | 10.184 | 0.60 | 1.80518 | 25.4 |
| 12 | 3.472 | 0.22 | — | — |
| 13 | 3.672 | 1.20 | 1.69305 | 30.9 |
| 14 | 4.256 | 3.50-6.67-4.71 | — | — |
| 15 | 11.421 | 1.27 | 1.52969 | 59.9 |
| 16 | 39.148 | 1.93-6.79-14.46 | — | — |
| 17* | −250.942 | 2.01 | 1.60000 | 62.0 |
| 18* | −15.309 | 3.31-0.97-1.67 | — | — |
| 19 | ∞ | 0.50 | 1.51633 | 64.1 |
| 20 | ∞ | 0.51 | — | — |
| 21 | ∞ | 0.30 | 1.51633 | 64.1 |
| 22 | ∞ | — | — | — |

TABLE 1-continued

Aspherical surface data (the aspherical surface coefficients not indicated are zero (0.00)):

| Surf. No. | K | A4 | A6 | A8 |
|---|---|---|---|---|
| 2 | 0.00 | $-0.24193 \times 10^{-3}$ | $-0.45186 \times 10^{-5}$ | $-0.14441 \times 10^{-7}$ |
| 8 | 0.00 | $-0.52281 \times 10^{-4}$ | $0.33736 \times 10^{-6}$ | |
| 9 | 0.00 | $0.17982 \times 10^{-3}$ | | |
| 17 | 0.00 | $-0.67128 \times 10^{-3}$ | | |
| 18 | 0.00 | $-0.31484 \times 10^{-3}$ | $-0.48228 \times 10^{-5}$ | $0.35895 \times 10^{-6}$ |

The symbol * designates the aspherical surface which is rotationally symmetrical with respect to the optical axis.

Embodiment 2

FIG. 5 is the lens arrangement of the zoom lens system, at the short focal length extremity, according to the second embodiment of the present invention. FIGS. 6A through 6E show aberrations occurred in the lens arrangement shown in FIG. 5.

Figure 7:
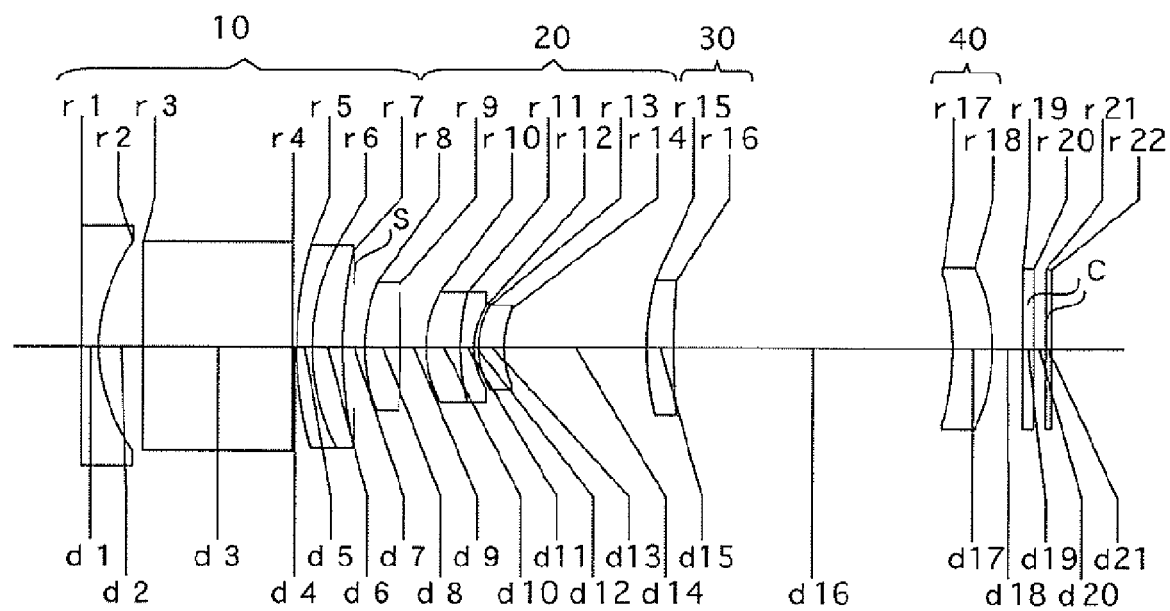
FIG. 7 is a lens arrangement of the zoom lens system, at the long focal length extremity, according to the second embodiment of the present invention.
Figures 8A, 8B, 8C, 8D, 8E:
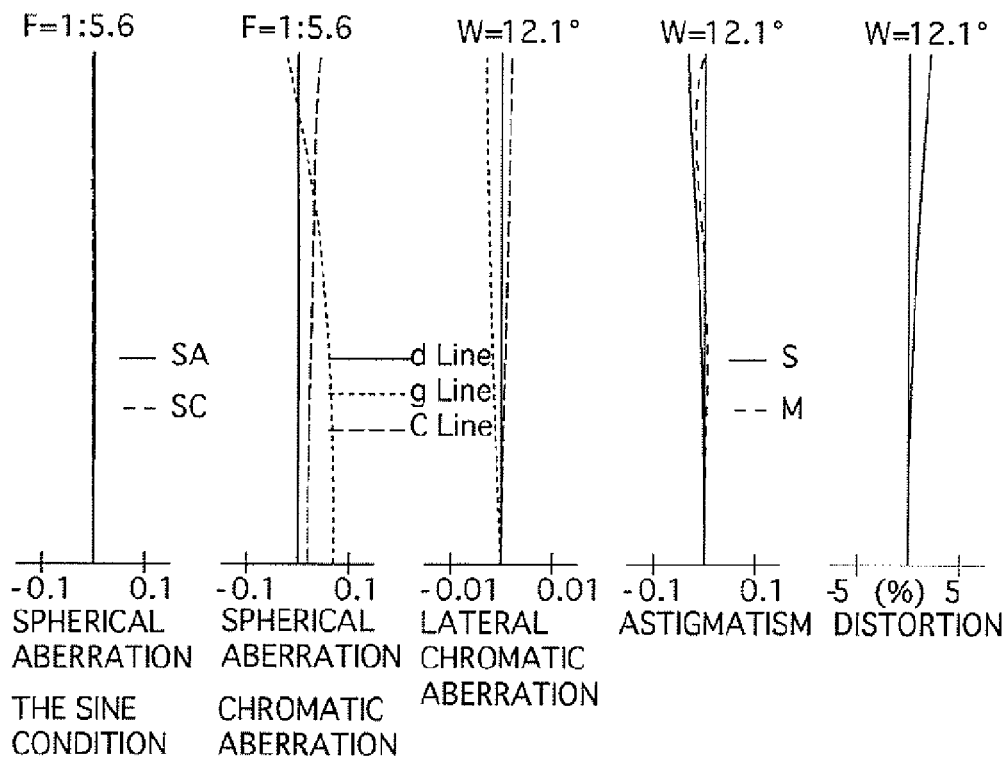
FIGS. 8A, 8B, 8C, 8D and 8E show aberrations occurred in the lens arrangement shown in FIG. 7.

FIG. 7 is the lens arrangement of the zoom lens system, at the long focal length extremity, according to the second embodiment of the present invention. FIGS. 8A through 8E show aberrations occurred in the lens arrangement shown in FIG. 7.

Table 2 shows the numerical values of the second embodiment.

The basic lens arrangement of the second embodiment is the same as that of the first embodiment, except that the diaphragm S is provided 0.50 in front of surface No. 8 (i.e., the object-side surface of the biconvex lens element of the positive second lens group 20).

TABLE 2

F = 1:2.9-4.1-5.6
f = 6.28-10.20-16.60
W = 31.0-19.6-12.1
fB = 0.59-0.59-0.59

| Surf. No. | r | d | Nd | ν |
|---|---|---|---|---|
| 1 | ∞ | 0.80 | 1.80610 | 40.9 |
| 2* | 7.773 | 2.02 | — | — |
| 3 | ∞ | 6.80 | 1.84666 | 23.8 |
| 4 | ∞ | 0.20 | — | — |
| 5 | 17.550 | 0.70 | 1.66657 | 58.3 |
| 6 | 10.144 | 1.41 | 1.84666 | 23.8 |
| 7 | 21.616 | 12.92-7.65-1.00 | — | — |
| 8* | 8.008 | 1.64 | 1.58375 | 63.1 |
| 9* | −39.545 | 1.16 | — | — |
| 10 | 5.431 | 1.57 | 1.48912 | 69.9 |
| 11 | 10.432 | 0.60 | 1.80586 | 28.4 |
| 12 | 3.401 | 0.20 | — | — |
| 13 | 3.592 | 1.20 | 1.56174 | 45.4 |
| 14 | 4.983 | 3.50-7.70-6.54 | — | — |
| 15 | 13.062 | 1.24 | 1.61244 | 52.0 |
| 16 | 40.846 | 1.71-5.51-12.76 | — | — |
| 17* | −15.286 | 1.81 | 1.69350 | 53.2 |
| 18* | −8.972 | 3.56-0.84-1.39 | — | — |
| 19 | ∞ | 0.50 | 1.51633 | 64.1 |
| 20 | ∞ | 0.51 | — | — |
| 21 | ∞ | 0.30 | 1.51633 | 64.1 |
| 22 | ∞ | — | — | — |

TABLE 2-continued

Aspherical surface data (the aspherical
surface coefficients not indicated are zero (0.00));

| Surf. No. | K | A4 | A6 | A8 |
|---|---|---|---|---|
| 2 | 0.00 | $-0.15414 \times 10^{-3}$ | $-0.41780 \times 10^{-5}$ | $0.15665 \times 10^{-7}$ |
| 8 | 0.00 | $-0.22838 \times 10^{-4}$ | $0.70463 \times 10^{-6}$ | |
| 9 | 0.00 | $0.23841 \times 10^{-3}$ | | |
| 17 | 0.00 | $-0.79203 \times 10^{-3}$ | | |
| 18 | 0.00 | $-0.62617 \times 10^{-3}$ | $-0.76557 \times 10^{-5}$ | $0.31585 \times 10^{-6}$ |

The symbol * designates the aspherical surface which is rotationally symmetrical with respect to the optical axis.

Embodiment 3

Figure 9:
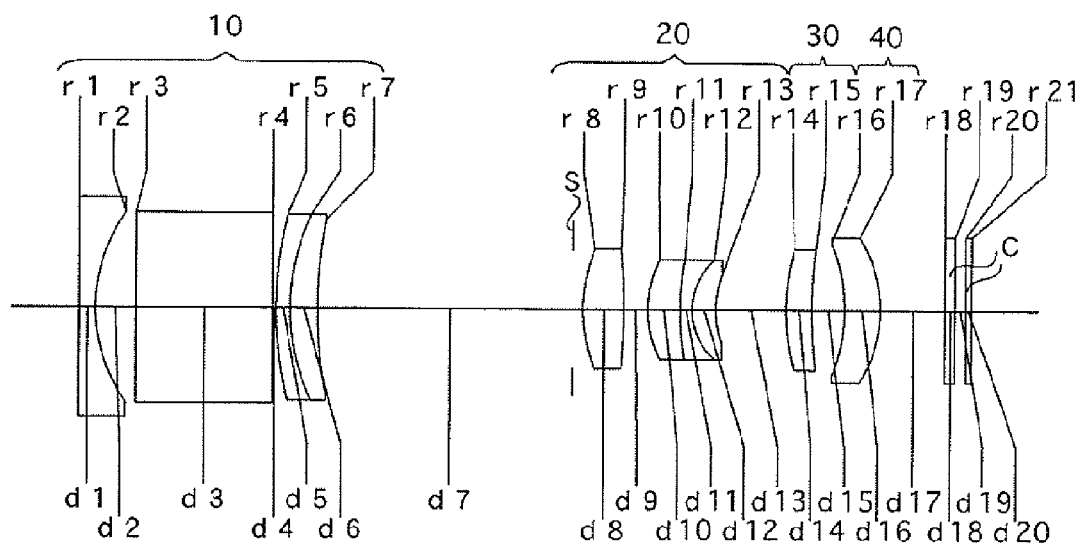
FIG. 9 is a lens arrangement of the zoom lens system, at the short focal length extremity, according to a third embodiment of the present invention.
Figures 10A, 10B, 10C, 10D, 10E:
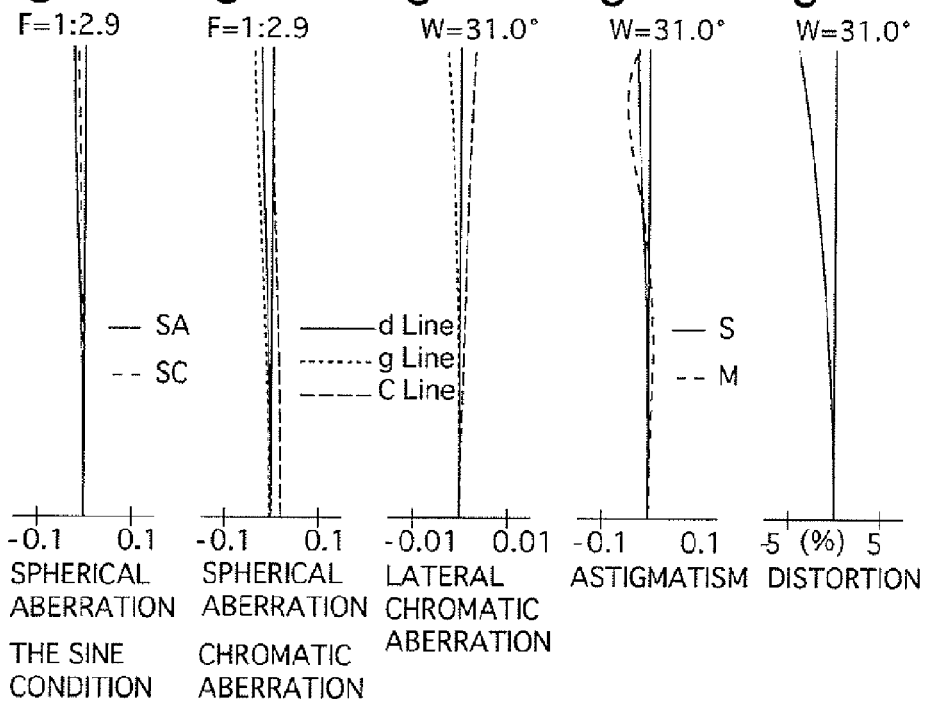
FIGS. 10A, 10B, 10C, 10D and 10E show aberrations occurred in the lens arrangement shown in FIG. 9.

FIG. 9 is the lens arrangement of the zoom lens system, at the short focal length extremity, according to the third embodiment of the present invention. FIGS. 10A through 10E show aberrations occurred in the lens arrangement shown in FIG. 9.

Figure 11:
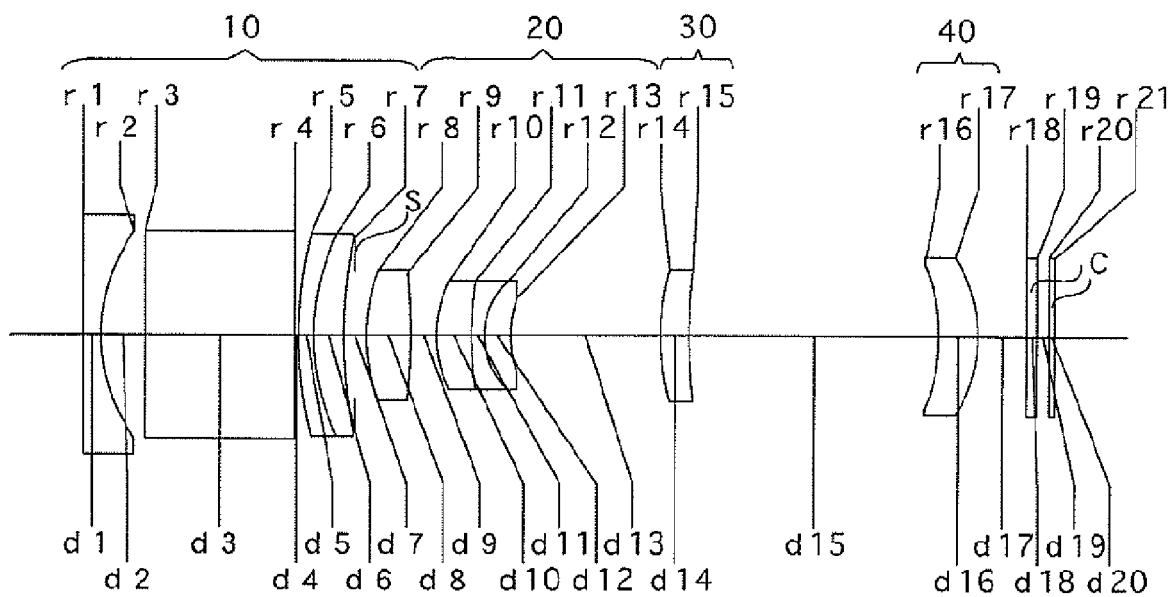
FIG. 11 is a lens arrangement of the zoom lens system, at the long focal length extremity, according to the third embodiment of the present invention.
Figures 12A, 12B, 12C, 12D, 12E:
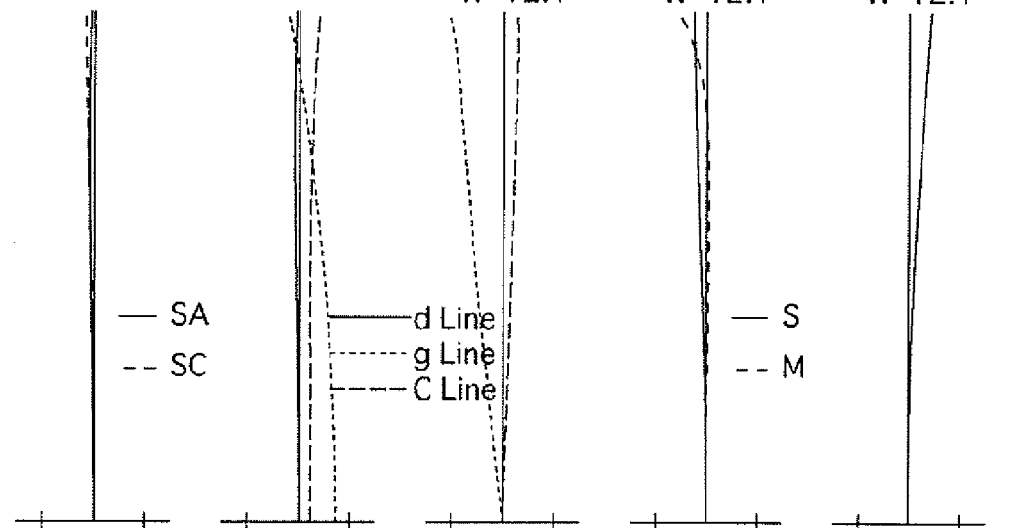
FIGS. 12A, 12B, 12C, 12D and 12E show aberrations occurred in the lens arrangement shown in FIG. 11.

FIG. 11 is the lens arrangement of the zoom lens system, at the long focal length extremity, according to the third embodiment of the present invention. FIGS. 12A through 12E show aberrations occurred in the lens arrangement shown in FIG. 11.

Table 3 shows the numerical values of the third embodiment.

The positive second lens group 20 includes a biconvex positive lens element, and cemented three lens elements having a positive meniscus lens element having the convex surface facing toward the object, a negative meniscus lens element having the convex surface facing toward the object and a positive meniscus lens element having the convex surface facing toward the object, in this order from the object.

The remaining lens arrangement of the third embodiment is the same as that of the second embodiment.

The diaphragm S is provided 0.50 in front of surface No. 8 (i.e., the object-side surface of the biconvex lens element of the positive second lens group 20).

TABLE 3

F = 1:2.9-4.2-5.6
f = 6.28-10.20-16.60
W = 31.0-19.8-12.1
fB = 0.59-0.59-0.59

| Surf. No. | r | d | Nd | ν |
|---|---|---|---|---|
| 1 | ∞ | 0.80 | 1.80442 | 41.3 |
| 2* | 7.578 | 2.02 | — | — |
| 3 | ∞ | 6.80 | 1.83400 | 45.2 |
| 4 | ∞ | 0.20 | — | — |
| 5 | 19.353 | 0.70 | 1.60000 | 62.4 |
| 6 | 10.896 | 1.36 | 1.85000 | 23.6 |
| 7 | 23.482 | 13.16-8.08-1.00 | — | — |
| 8* | 8.009 | 2.00 | 1.60093 | 62.9 |
| 9* | −29.525 | 1.18 | — | — |
| 10 | 5.749 | 1.58 | 1.48755 | 70.3 |
| 11 | 14.647 | 0.60 | 1.80599 | 30.0 |
| 12 | 3.318 | 1.20 | 1.53964 | 49.1 |
| 13 | 4.985 | 3.50-8.27-6.87 | — | — |
| 14 | 11.279 | 1.30 | 1.61999 | 56.6 |
| 15 | 24.161 | 1.62-4.41-11.45 | — | — |
| 16* | −10.317 | 1.80 | 1.63515 | 46.0 |
| 17* | −6.726 | 3.28-0.80-2.24 | — | — |
| 18 | ∞ | 0.50 | 1.51633 | 64.1 |

TABLE 3-continued

| 19 | ∞ | 0.51 | — | — |
|---|---|---|---|---|
| 20 | ∞ | 0.30 | 1.51633 | 64.1 |
| 21 | ∞ | — | — | — |

Aspherical surface data (the aspherical
surface coefficients not indicated are zero (0.00)):

| Surf. No. | K | A4 | A6 | A8 |
|---|---|---|---|---|
| 2 | 0.00 | $-0.16899 \times 10^{-3}$ | $-0.41581 \times 10^{-5}$ | $0.55935 \times 10^{-8}$ |
| 8 | 0.00 | $-0.15155 \times 10^{-3}$ | $-0.12743 \times 10^{-5}$ | |
| 9 | 0.00 | $0.14142 \times 10^{-3}$ | | |
| 16 | 0.00 | $-0.89570 \times 10^{-3}$ | | |
| 17 | 0.00 | $0.16883 \times 10^{-4}$ | $0.46079 \times 10^{-5}$ | $-0.42420 \times 10^{-7}$ |

The symbol * designates the aspherical surface which is rotationally symmetrical with respect to the optical axis Embodiment 4

FIG. 13 is the lens arrangement of the zoom lens system, at the short focal length extremity, according to the fourth embodiment of the present invention. FIGS. 14A through 14E show aberrations occurred in the lens arrangement shown in FIG. 13.

Figure 15:
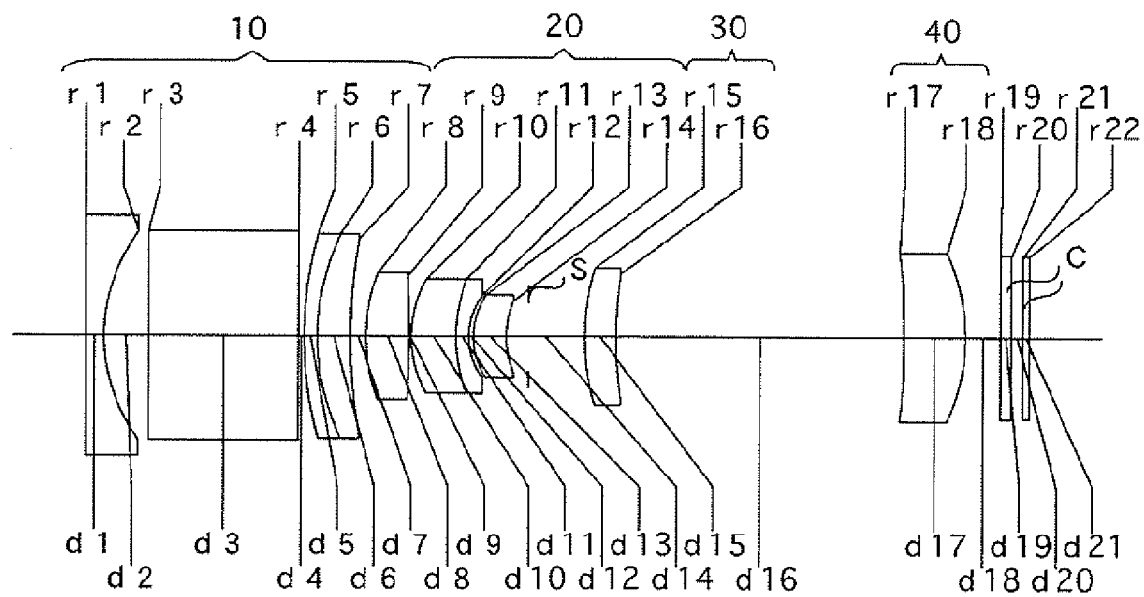
FIG. 15 is a lens arrangement of the zoom lens system, at the long focal length extremity, according to the fourth embodiment of the present invention.
Figures 16A, 16B, 16C, 16D, 16E:
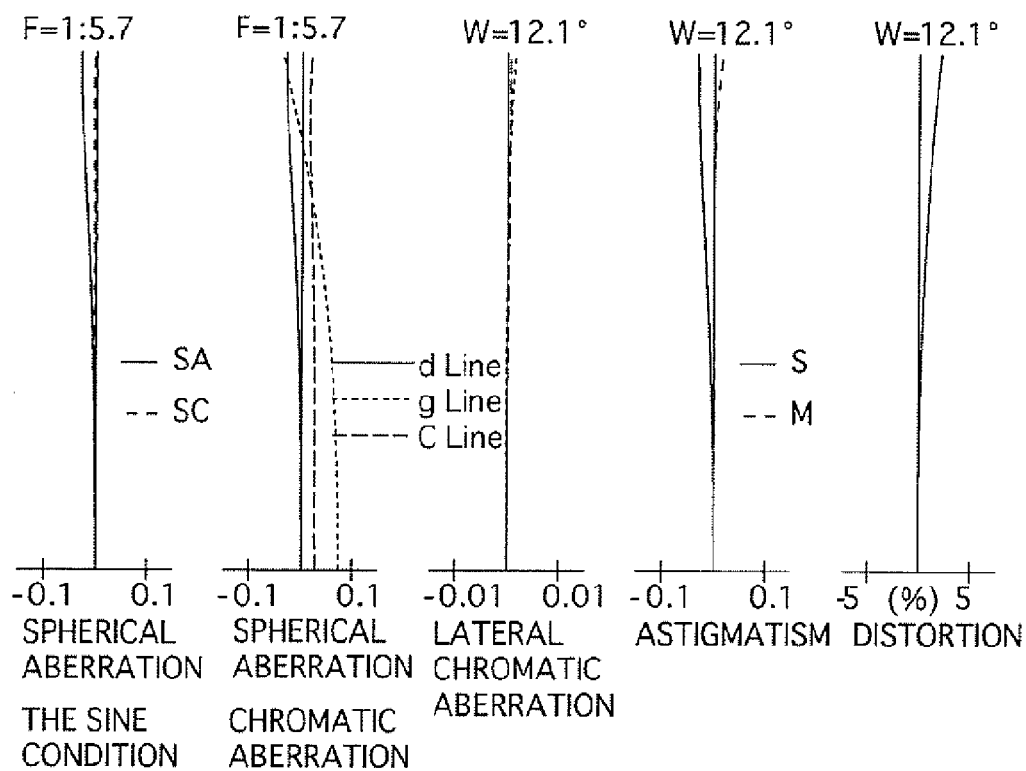
FIGS. 16A, 16B, 16C, 16D and 16E show aberrations occurred in the lens arrangement shown in FIG. 15.

FIG. 15 is the lens arrangement of the zoom lens system, at the long focal length extremity, according to the fourth embodiment of the present invention. FIGS. 16A through 16E show aberrations occurred in the lens arrangement shown in FIG. 15.

Table 4 shows the numerical values of the fourth embodiment.

The basic lens arrangement of the fourth embodiment is the same as that of the first embodiment except that the diaphragm S is provided 1.00 behind surface No. 14 (i.e., the image-side surface of the most image-side positive meniscus lens element of the positive second lens group 20).

TABLE 4

F = 1:2.9-4.1-5.7
f = 6.28-10.20-16.60
W = 31.0-19.7-12.1
fB = 0.59-0.59-0.59

| Surf. No. | r | d | Nd | ν |
|---|---|---|---|---|
| 1 | ∞ | 0.80 | 1.80610 | 40.9 |
| 2* | 7.397 | 2.02 | — | — |
| 3 | ∞ | 6.80 | 1.84666 | 23.8 |
| 4 | ∞ | 0.28 | — | — |
| 5 | 17.009 | 0.60 | 1.72916 | 54.7 |
| 6 | 10.544 | 1.50 | 1.84666 | 23.8 |
| 7 | 25.079 | 11.81-6.66-0.70 | — | — |
| 8* | 7.878 | 1.96 | 1.58636 | 60.9 |
| 9* | −50.342 | 0.10 | — | — |
| 10 | 5.339 | 2.01 | 1.48749 | 70.2 |
| 11 | 6.999 | 0.60 | 1.80518 | 25.4 |
| 12 | 3.188 | 0.20 | — | — |
| 13 | 3.356 | 1.50 | 1.51701 | 57.6 |
| 14 | 4.266 | 3.00-6.78-3.53 | — | — |
| 15 | 10.278 | 1.42 | 1.51633 | 64.1 |
| 16 | 17.278 | 1.49-4.43-13.04 | — | — |
| 17* | −90.000 | 2.80 | 1.54358 | 55.7 |
| 18* | −9.135 | 2.56-1.00-1.60 | — | — |
| 19 | ∞ | 0.50 | 1.51633 | 64.1 |
| 20 | ∞ | 0.51 | — | — |
| 21 | ∞ | 0.30 | 1.51633 | 64.1 |
| 22 | ∞ | — | — | — |

TABLE 4-continued

Aspherical surface data (the aspherical surface coefficients not indicated are zero (0.00)):

| Surf. No. | K | A4 | A6 | A8 |
|---|---|---|---|---|
| 2 | 0.00 | $-0.20233 \times 10^{-3}$ | $-0.41636 \times 10^{-5}$ | $-0.19175 \times 10^{-7}$ |
| 8 | 0.00 | $-0.33178 \times 10^{-4}$ | $0.52309 \times 10^{-6}$ | |
| 9 | 0.00 | $0.23195 \times 10^{-3}$ | | |
| 17 | 0.00 | $-0.65840 \times 10^{-3}$ | | |
| 18 | 0.00 | $-0.13214 \times 10^{-3}$ | $0.54923 \times 10^{-5}$ | $-0.50595 \times 10^{-7}$ |

The symbol * designates the aspherical surface which is rotationally symmetrical with respect to the optical axis.

The numerical values of each condition for each embodiment are shown in Table 5.

TABLE 5

| | Embod. 1 | Embod. 2 | Embod. 3 | Embod. 4 |
|---|---|---|---|---|
| Condition (1) | 1.33 | 1.28 | 1.25 | 1.22 |
| Condition (2) | 1.45 | 1.54 | 1.50 | 1.46 |
| Condition (3) | 2.79 | 3.24 | 3.11 | 2.73 |

As can be understood from Table 5, the first through fourth embodiments satisfy conditions (1) through (3). Furthermore, as can be understood from the aberration diagrams, the various aberrations are adequately corrected.

According to the above description, a negative-lead type zoom lens system with a zoom ratio of approximately 3, which is suitable for a fixed-length zoom lens system having a refractive optical system (reflection member), and/or having an image-stabilizing zoom lens system having an image-stabilizing lens group, can be attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, a positive third lens group and a positive fourth lens group, in this order from an object, wherein said negative first lens group further comprises a reflection member;
wherein said first lens group remains stationary when zooming is performed from the short focal length extremity to the long focal length extremity; and
wherein said zoom lens system satisfies the following conditions:

$$1.0 < f2/(fw \times ft)^{1/2} < 1.5$$

$$1.2 < |f1a|/fw < 1.8 \ (f1a < 0)$$

$$2.0 < f1b/ft < 4.0$$

wherein f2 designates the focal length of said positive second lens group;
fw designates the focal length of the entire zoom lens system at the short focal length extremity;
ft designates the focal length of the entire zoom lens system at the long focal length extremity;
f1a designates the combined focal length of an object-side lens element with respect to said reflection member in said negative first lens group; and
f1b designates the combined focal length of image-side lens elements with respect to said reflection member in said negative first lens group.

2. The zoom lens system according to claim 1, wherein said positive fourth lens group is arranged to move along the optical axis upon zooming from the short focal length extremity to the long focal length extremity.

3. The zoom lens system according to claim 1, wherein said positive second lens group comprises a positive lens element, a positive lens element, a negative lens element and a positive lens element, in this order from the object.

4. The zoom lens system according to claim 1, wherein said positive fourth lens group comprises a positive single lens element having a convex surface facing toward the image; and
wherein said positive single lens element is provided with at least one aspherical surface.

5. The zoom lens system according to claim 3, wherein said negative lens element of said positive second lens group comprises a meniscus lens element having the convex surface facing the object, and the image-side surface of the most image-side positive lens element of said positive second lens group is formed as a concave surface.

6. The zoom lens system according to claim 1, wherein said negative first lens group comprises a negative lens element, said reflection member, and cemented lens elements having a negative lens element and a positive lens element, in this order from the object.

7. The zoom lens system according to claim 1, wherein said positive second lens group comprises an image-stabilizing lens group which is arranged to move in a direction orthogonal to the optical axis.

8. A zoom lens system comprising a negative first lens group, a positive second lens group, a positive third lens group and a positive fourth lens group, in this order from the object, wherein said first through fourth lens groups comprise an optical system by which a single real image is formed;
wherein said negative first lens group further comprises a reflection member; and
wherein said first lens group remains stationary, and said positive fourth lens group is moved, when zooming is performed from the short focal length extremity to the long focal length extremity.

9. The zoom lens system according to claim 8, wherein said positive fourth lens group comprises a positive single lens element having a convex surface facing toward the image; and
wherein said positive single lens element is provided with at least one aspherical surface.

10. The zoom lens system according to claim 8, wherein said positive second lens group comprises a positive lens element, a positive lens element, a negative lens element and a positive lens element, in this order from the object.

11. A zoom lens system comprising a negative first lens group, a positive second lens group, a positive third lens group and a positive fourth lens group, in this order from the object, wherein said negative first lens group further comprises a reflection member;
wherein said first lens group remains stationary when zooming is performed from the short focal length extremity to the long focal length extremity; and wherein said positive second lens group comprises a positive lens element, a positive lens element, a negative lens element and a positive lens element, in this order from the object.

12. The zoom lens system according to claim 11, wherein said negative lens element of said positive second lens group comprises a meniscus lens element having the convex surface facing the object, and the image-side surface of the most image-side positive lens element of said positive second lens group is fonned as a concave surface.

13. The zoom lens system according to claim 11, wherein said negative first lens group comprises a negative lens element, said reflection member, and cemented lens elements having a negative lens element and a positive lens element, in this order from the object.

14. The zoom lens system according to claim 11, wherein said positive second lens group comprises an image-stabilizing lens group which is arranged to move in a direction orthogonal to the optical axis.

15. A zoom lens system consisting of a negative first lens group, a positive second lens group, a positive third lens group and a positive fourth lens group, in this order from the object,
wherein said positive second lens group comprises an image-stabilizing lens group which is arranged to move in a direction orthogonal to the optical axis.

16. The zoom lens system according to claim 15, wherein said negative first lens group further comprises a reflection member; and
wherein said zoom lens system satisfies the following conditions:

$1.0 < f2/(fw \times ft)^{1/2} < 1.5$ $1.2 < |f1a|/fw < 1.8 (f1a<0)$ $2.0 < f1b/ft < 4.0$ wherein
f2 designates the focal length of said positive second lens group;
fw designates the focal length of the entire zoom lens system at the short focal length extremity;
ft designates the focal length of the entire zoom lens system at the long focal length extremity;
f1a designates the combined focal length of an object-side lens element with respect to said reflection member in said negative first lens group; and
f1b designates the combined focal length of image-side lens elements with respect to said reflection member in said negative first lens group.

17. The zoom lens system according to claim 15, wherein said positive second lens group comprises a positive lens element, a positive lens element, a negative lens element and a positive lens element, in this order from the object.

18. A zoom lens system comprising a negative first lens group, a positive second lens group, a positive third lens group and a positive fourth lens group, in this order from the object, wherein:
said positive second lens group comprises an image-stabilizing lens group which is arranged to move in a direction orthogonal to the optical axis;
said negative first lens group further comprises a reflection member; and
said zoom lens system satisfies the following conditions:

$1.0 < f2/(fw \times ft)^{1/2} < 1.5$ $1.2 < |f1a|/fw < 1.8 (f1a<0)$ $2.0 < f1b/ft < 4.0$ wherein
f2 designates the focal length of said positive second lens group;
fw designates the focal length of the entire zoom lens system at the short focal length extremity;
ft designates the focal length of the entire zoom lens system at the long focal length extremity;
f1a designates the combined focal length of an object-side lens element with respect to said reflection member in said negative first lens group; and
f1b designates the combined focal length of image-side lens elements with respect to said reflection member in said negative first lens group.

* * * * *